US010938073B2

(12) United States Patent
Inokuchi et al.

(10) Patent No.: US 10,938,073 B2
(45) Date of Patent: Mar. 2, 2021

(54) METAL NEGATIVE ELECTRODE CELL

(71) Applicant: Ineova Corp., Tokyo (JP)

(72) Inventors: Masayuki Inokuchi, Tokyo (JP); Masao Murota, Tokyo (JP)

(73) Assignee: Ineova Corp.

(*) Notice: Subject to any disclaimer, the term of this patent is extended or adjusted under 35 U.S.C. 154(b) by 0 days.

(21) Appl. No.: 16/492,860

(22) PCT Filed: Feb. 27, 2018

(86) PCT No.: PCT/JP2018/007208
§ 371 (c)(1),
(2) Date: Sep. 10, 2019

(87) PCT Pub. No.: WO2018/163910
PCT Pub. Date: Sep. 13, 2018

(65) Prior Publication Data
US 2020/0185786 A1     Jun. 11, 2020

(30) Foreign Application Priority Data
Mar. 10, 2017   (JP) ................................. 2017-046230

(51) Int. Cl.
*H01M 10/42*     (2006.01)
*H01M 4/38*      (2006.01)
*H01M 12/08*     (2006.01)
*H01M 50/60*     (2021.01)
*H01M 4/02*      (2006.01)

(52) U.S. Cl.
CPC ......... *H01M 10/4214* (2013.01); *H01M 4/38* (2013.01); *H01M 12/08* (2013.01); *H01M 50/60* (2021.01); *H01M 2004/027* (2013.01)

(58) Field of Classification Search
CPC ....... H01M 2/36; H01M 2/38; H01M 10/4214
USPC ......................................................... 429/61
See application file for complete search history.

(56) References Cited

U.S. PATENT DOCUMENTS

| 3,577,281 A | 5/1971 | Pountney et al. |
| 2001/0016285 A1 | 8/2001 | Cho et al. |
| 2017/0018827 A1 | 1/2017 | Suyama |

(Continued)

FOREIGN PATENT DOCUMENTS

| EP | 0186204 A2 | 7/1986 |
| JP | H06163085 A | 6/1994 |
| JP | 2000133322 A | 5/2000 |

(Continued)

OTHER PUBLICATIONS

Extended European Search Report including Written Opinion for Application No. EP187635503, dated Dec. 10, 2020, pp. 1-7.

*Primary Examiner* — James M Erwin
(74) *Attorney, Agent, or Firm* — Lerner, David, Littenberg, Krumholz & Mentlik, LLP

(57) ABSTRACT

In a metal negative cell in which the negative electrode mainly comprises a metal such as aluminum, magnesium, zinc, lithium, etc., self discharge readily occurs when the negative electrode and an electrolytic solution are in contact, and the problem of large capacity loss of the cell readily occurs. The metal negative cell is provided with a metal negative cell in which the self-discharge amount is reduced, and the capacity loss of the cell is reduced during use or storage, whereby the metal negative cell varies the cell output according to demand.

17 Claims, 11 Drawing Sheets

(56) References Cited

U.S. PATENT DOCUMENTS

2017/0047627 A1\* 2/2017 Englert .................. H01M 2/40

FOREIGN PATENT DOCUMENTS

| JP | 200571726 A | 3/2005 |
|----|-------------|--------|
| JP | 2012230892 A | 11/2012 |
| JP | 2013101788 A | 5/2013 |
| JP | 2013168360 A | 8/2013 |
| JP | 201489904 A | 5/2014 |
| JP | 2015032450 A | 2/2015 |
| JP | 2015228317 A | 12/2015 |
| JP | 2016066429 | 4/2016 |
| JP | 201671990 A | 5/2016 |
| JP | 201685789 A | 5/2016 |
| JP | 201722036 A | 1/2017 |

\* cited by examiner

Principle of aluminum air cell

1st embodiment

Circuit block diagram of the control board

3rd embodiment

4th embodiment

5th embodiment

6th embodiment

7th embodiment

Flowchart of feed control of Aluminum foil

Flowchart of controle negative electrode electrolyte

Flowchart regarding positive electrode potential

METAL NEGATIVE ELECTRODE CELL

CROSS REFERENCE TO RELATED APPLICATIONS

The present application is a national phase entry under 35 U.S.C. § 371 of International Application No. PCT/JP2018/007208, filed Feb. 27, 2018, published in Japanese, which claims the benefit of and priority to JP Patent Application No. 2017-046230, filed Mar. 10, 2017, the entire disclosures of which are incorporated by reference herein.

TECHNICAL FIELD

The present invention relates to a metal negative electrode cell or battery (is referred to as "cell", but the both are effective in this application) which negative electrode is mainly composed of metal.

RELATED ART

In recent years, a metal negative electrode cell using a metal such as aluminum or magnesium, which has a high energy density, as a cathode is attracting attention. As for this metal negative electrode cell, there are an active material positive electrode cell in which the negative electrode is mainly made of a metal such as aluminum and magnesium and the positive electrode has a positive electrode active material, and an air cell using an air electrode for the positive electrode.

By the way, Patent Document 1 proposes an aluminum negative electrode cell having aluminum or an aluminum alloy as a negative electrode and a positive electrode active material as a positive electrode. Patent Document 2 proposes an air cell using aluminum or magnesium for the negative electrode.

Patent document 3 discloses an air cell in which a porous member is provided in a cell, and a columnar body of an aluminum negative electrode that can be continuously replenished in contact with the upper surface of the columnar body is used.

Also, patent document 4 has been proposed a reel type magnesium cell for unwinding and winding a negative electrode film in which a magnesium foil is laminated on an insulating film, so that power generation can be turned on and off by dividing the magnesium foil into blocks

CITATION LIST

Patent Literature

Patent document 1: JP 2005-71726 A
Patent document 2: JP 2017-22036 A
Patent document 3: JP 2012-230892 A
Patent document 4: JP-2014-89904 A

SUMMARY OF INVENTION

Technical Problem

In a metal negative electrode cell in which the negative electrode is mainly made of a metal such as aluminum or magnesium, self-discharge tends to occur when the negative electrode and the electrolytic solution are in contact with each other, and a problem that the cell has a large capacity loss tends to occur.

In addition, the state of the electrolyte solution in the cell and the electrode surface state are likely to change, and even if the negative electrode is supplied in the same state as in Patent Document 3, it is difficult to obtain the same output. Moreover, even if the power generation can be turned on and off in the reel type cell as in Patent Document 4, it is difficult to vary the power generation amount according to demand.

The present invention reduces the self-discharge amount, reduces the capacity loss of the cell during use or storage, and also provides a metal negative cell that can stably change the cell output according to demand, and generally it is an object of the present invention to provide a metal negative electrode cell having a high degree of freedom in a metal negative electrode cell with large restrictions on the structure and dimensions.

Solution to Problem

In order to solve the problem, the present invention provides the following metal negative electrode cell.

(1) A metal negative electrode cell having a positive electrode, a metal negative electrode, and an electrolytic solution, wherein the metal negative electrode includes immersion means in which the metal negative electrode is immersed in the electrolyte according to demand.

(2) In the above (1), the metal negative electrode cell wherein the electrode of the metal negative electrode is made of sol metal.

(3) In the above (1) or (2), the metal negative electrode is pushed or pushed back toward the electrolyte, or the liquid level of the electrolyte solution is raised or lowered, whereby the metal negative electrode cell includes immersing means for dipping the metal negative electrode in the electrolyte according to demand.

(4) In the above (1) to (3), a metal negative electrode cell in which the electrode of the metal negative electrode mainly comprises a metal of aluminum, magnesium, zinc, or lithium, or an alloy or a mixed composition thereof.

(5) In the above (1) to (4), the metal negative electrode cell wherein an output voltage of the cell is detected, and the output is controlled by controlling an area of the metal negative electrode to be immersed in the electrolytic solution in accordance with the increase or decrease of the output voltage.

(6) In the above (1) to (5), the metal negative electrode cell wherein the metal negative electrode cell has a water level adjusting mechanism of the electrolyte solution and maintains the electrolyte solution at a constant water level.

(7) In the above (1) to (6), the metal negative electrode cell wherein the residue after the negative electrode reaction is precipitated by a precipitation filter.

(8) In the above (1)-(7), the metal negative electrode cell that includes a separator for separating the electrolyte solution into a positive electrode-side electrolyte solution and a negative electrode-side electrolyte solution, and that includes an electrolyte delivery mechanism for delivering a negative electrode electrolyte to the negative electrode electrolyte solution and/or an electrolyte delivery mechanism for delivering the positive electrode electrolyte to the positive electrode electrolyte solution, whereby the concentration of a negative electrode electrolyte solution and/or a positive electrode electrolyte solution are controlled.

(9) In the above (1) to (8), the metal negative electrode cell with a reaction cassette which integrally accommodates the main body of the metal negative electrode cell and/or the electrolyte delivery mechanism, except a part thereof.

(10) In the above (1) to (9), a metal negative electrode cell having a sealed structure using the material, wherein the generated gas permeates but the electrolyte does not leak.

Effects of the Invention

According to the present invention, a self-discharge amount is reduced by devising a contact method between a negative electrode and an electrolyte solution, it is possible to provide a metal negative electrode cell in which the capacity loss of the cell at the time of use or storage is reduced, and the cell output can be stably changed according to demand

DESCRIPTION OF EMBODIMENTS

Figure 1:
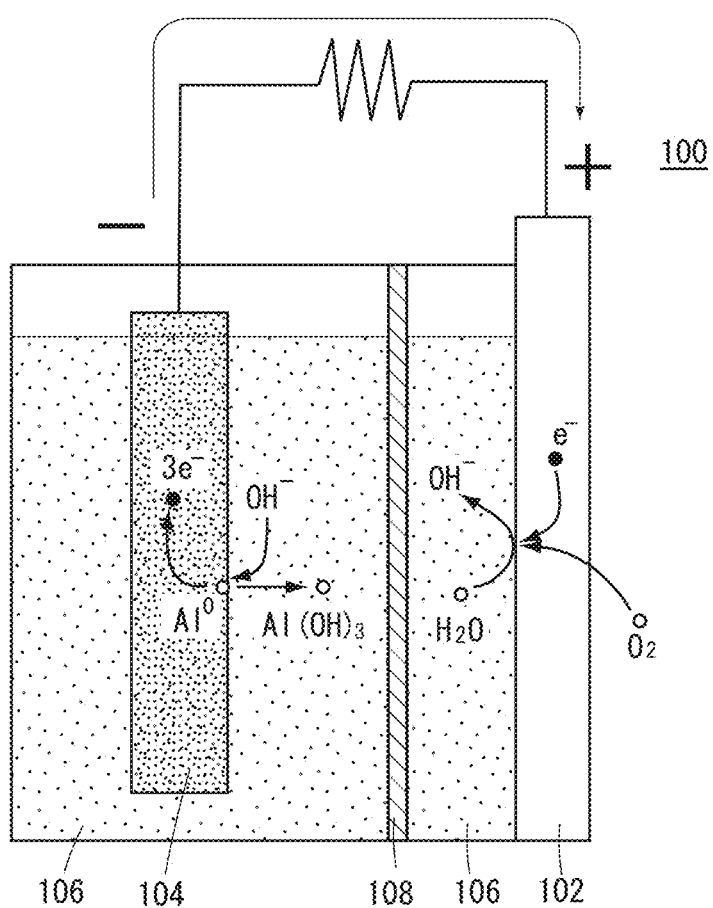
FIG. 1 is a diagram explaining the principle of an aluminum air cell.

The positive electrode of the present invention is an electrode paired with a metal negative electrode, and for example, an electrode used for an active material positive electrode cell having a positive electrode active material as a positive electrode or an air cell using an air electrode as a positive electrode can be used.

The metal negative electrode of the present invention is provided with an auxiliary material and a current collector as required for a metal electrode. Metals such as aluminum, magnesium, zinc, lithium, and also their alloys and mixed compositions thereof are included as the metal electrode.

In the case of mainly aluminum, a cooking aluminum foil used in general households can be used, which is preferable in terms of cost and versatility.

A magnesium-based material is preferable in that a higher power generation voltage can be obtained.

In the case of zinc, the generated voltage is low, but it is preferable in that self-discharge is small.

Lithium is preferable in that a high power generation voltage and a high energy density can be obtained.

The shape of the electrode includes a foil, a plate, a wire, a bar, a sintered body, a non-woven fabric, or a composite or laminate thereof. In the case of using the metal negative electrode, a uniform cross-section is easier to send out.

The foil is preferable in that it can be wound and stored, and the nonwoven fabric is preferable in terms of surface area expansion.

Further, embossing, corrugated processing, etching unevenness processing, and the like are preferable in terms of surface area expansion.

Other than the above shapes, sol metals are also included. The sol metal is a product obtained by kneading a granular metal, a powder metal, or a fine powder metal made of the above metal in a sol-accelerating agent. Since the sol metal can be handled in a similar way as a liquid, it can be housed and stored in any shape, and the negative electrode material can be supplied by piping such as a pipe. Further, it is preferable that the negative electrode material can be supplied to a large number of cells from one place.

The electrolyte solution of the present invention is appropriately selected according to the cell structure.

For example, potassium hydroxide or sodium hydroxide can be used for an alkaline aqueous solution, and sulfuric acid or phosphoric acid can be used for an acidic aqueous solution.

Further, a coarsening inhibitor such as sodium sulfide ($Na2_S$) and sodium thiosulfate ($Na_2S_2O_3$), a self-discharge inhibitor such as acidic sodium pyrophosphate ($Na_2H_2P_2O_7$), and the like may be added.

The immersion means of the present invention is a means in which the metal negative electrode is wetted with the electrolyte solution according to demand. For example, it is a method in which the metal negative electrode is immersed in the electrolyte solution by pushing out or pushing back toward the electrolyte solution, or raising or lowering the liquid level of the electrolyte solution.

As a method of pushing out or pushing back toward an electrolytic solution in a case of plate shape, the feeder roller is applied to one side and the tough roller is pressed against the metal negative electrode from the other side, whereby the metal negative electrode can be pushed out or pushed back by rotating the feed roller. If the rotation of the feed roller is stopped during the reaction, the metal anode electrode may appear to be pushed back. Moreover, it can be pushed out by ejection the liquid, such as circulating water of the electrolyte solution, from a nozzle simultaneously with the front surface and the rear surface. In the case of a block or a rod shape, a metal negative electrode is inserted into a cylinder by falling due to its own weight, and mechanical or air/hydraulic pressure is applied to the end face, whereby the metal negative electrode can be pushed out. In the case of a cylinder, the screw is cut on the side surface thereof, so that it can be pushed out or pushed back by its own axial rotation. In the case of the sol metal 10a, it can be pushed out or pushed back by a pump.

The electrolyte level can be raised by the method of gradually accumulating the electrolyte solution by a pump or natural fall, gradually reducing the bathtub volume of the electrolyte solution, the capillary phenomenon, and the like. These methods are preferable in that they can be controlled intensively when a large number of cells are operated.

The separator of the present invention may be used as needed, and conventionally known separator can be used. However, it is preferable that the separator is fine enough to prevent the precipitates from intermingling. Moreover, it is preferable that it has the strength of the grade which cannot be penetrated by a deposit. For example, porous membranes such as polyethylene, polypropylene, polyethylene terephthalate, and cellulose, nonwoven fabrics such as resin nonwoven fabrics and glass fiber nonwoven fabrics, ion permeable membranes, and solid electrolytes that allow only ions to pass through can be used without limitation.

Hereinafter, embodiments of a metal negative electrode cell according to the present invention will be described in detail with reference to the accompanying drawings. In the drawings, the same elements are denoted by the same reference numerals, and redundant description is omitted.

Further, the embodiment of a metal negative electrode cell according to the present invention will be described below by illustrating an air cell structure with the metal negative electrode of an aluminum as a metal and a foil as shape.

First Embodiment (Construction)

FIG. 1 is a diagram for explaining the principle of an aluminum air cell. As shown in FIG. 1, the aluminum air cell 100 is configured with an electrolyte solution 106 interposed between a positive electrode (air electrode) 102 and a negative electrode (aluminum electrode) 104. In the positive electrode 102, a reaction of the formula (1) that generates a hydroxyl group occurs from oxygen in the air, electrons in the positive electrode, and water in the electrolytic solution.

On the other hand, in the negative electrode, reaction of formula (2) in which aluminum hydroxide and electrons are generated from aluminum and hydroxyl group occurs. Therefore, as a whole, the reaction of formula (3) in which aluminum hydroxide is generated from aluminum, oxygen, and water can be caused to obtain electrical energy.

$$3/4O_2+3/2H_2O+3e^- \rightarrow 3OH^- (E0=0.4 \text{ V}) \quad (1)$$

$$Al+3OH^- \rightarrow Al(OH)_3+3e^- (E0=-2.31 \text{ V}) \quad (2)$$

$$4Al+3O_2+6H_2O=4Al(OH)_3 (E0=+2.71 \text{ V}) \quad (3)$$

Figure 2:
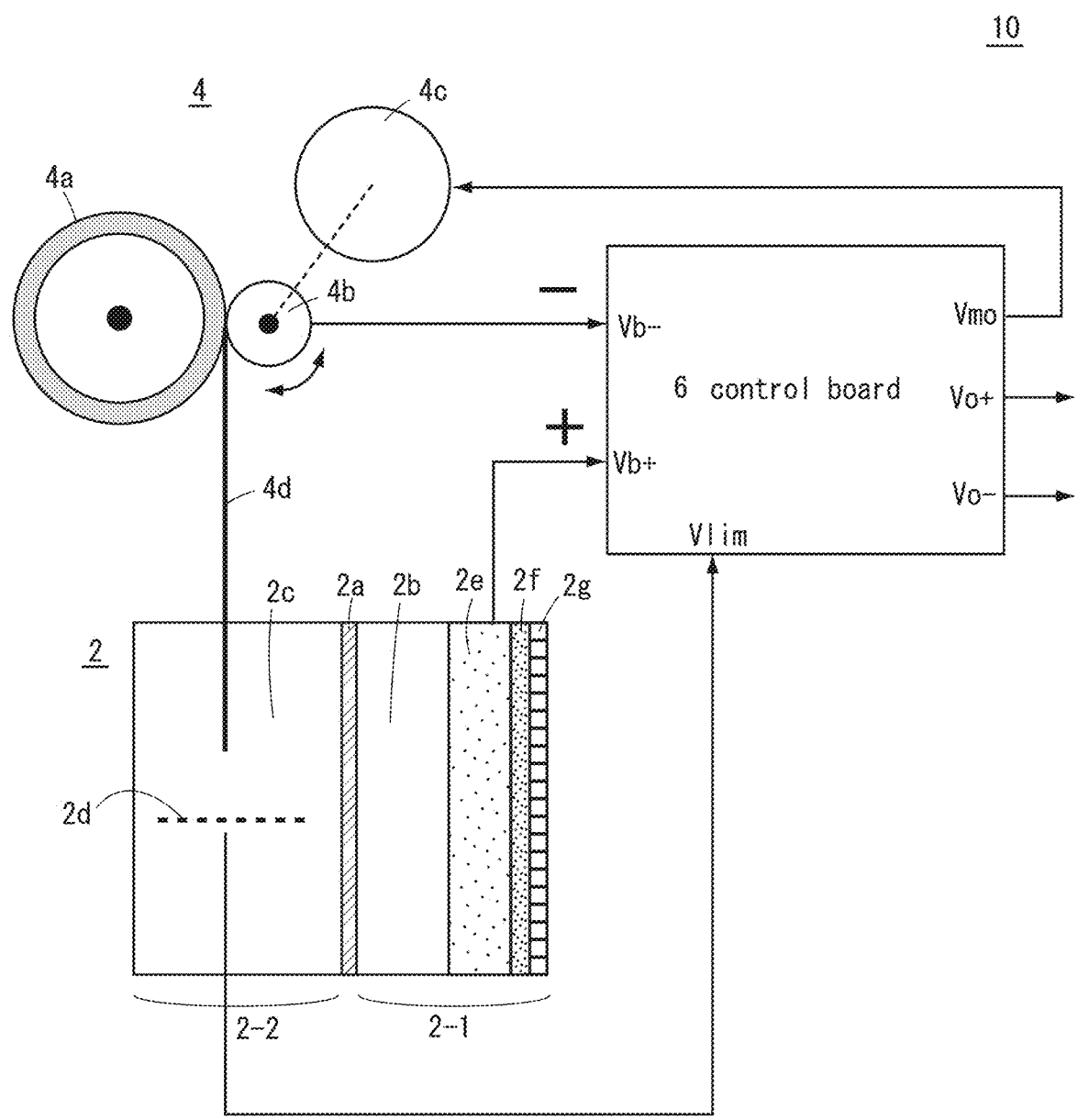
FIG. 2 is a diagram explaining the structure of a metal negative electrode cell 10 according to a first embodiment.

FIG. 2 is a diagram for explaining the configuration of the metal negative electrode cell 10 according to the first embodiment. The metal negative electrode cell 10 includes: a cell body 2; an aluminum foil feeding means 4 as an immersion means, and a control board 6 for controlling the aluminum foil feeding means 4.

The cell body 2 is separated into two sections by a separator 2a, one section (also referred to as "positive electrode side") 2-1 is filled with the positive electrode electrolyte solution 2b and the other section (also referred to as a "negative electrode side") is filled with the negative electrode electrolyte solution 2b.

As the separator 2a, for example, the above separator can be used.

As the positive electrode electrolyte 2b, for example, 1 wt. % to 30 wt. % of potassium hydroxide, sodium hydroxide and the like can be used.

As the negative electrode electrolyte 2c, for example, a solution obtained by adding 1 wt. % to 20 wt. % of potassium hydroxide or sodium hydroxide to 5 wt. % to 30 wt. % of saline can be used.

The surface facing the separator 2a on the positive electrode side 2-1 has a three-layer structure, in which a positive electrode material 2e, a catalyst 2f on the back surface thereof, and a water-repellent porous film 2g on the back surface thereof are formed. For the positive electrode material 2e, for example, metal mesh, metal foam, felt carbon, carbon cloth, carbon paper or the like can be used. As the catalyst 2f, for example, platinum group elements (Ru, Rh, Pd, Os, Ir, Pt), iron group elements (Fe, Co, Ni), manganese group elements (Mn, Tc, Re, Bh), etc. can be used. For the porous film 2g having water repellency, for example, porous fluorine Resins (PTFE, FEP, PVF, etc.), porous hydrocarbon resins (PE, PP, etc.), porous silicon films, and the like can be used. Moreover, the positive electrode material 2e and the catalyst 2f may be interchanged or integrated. For example, a metal mesh or carbon paper that has been subjected to a water repellent treatment with a fluororesin and supported with a catalyst 2f can be used.

A limit sensor (electrolyte potential detection electrode) 2d is provided inside the negative electrode electrolyte 2c of the negative electrode side 2-2. A limit sensor 2d includes, for example, a low-cost metal (Ti, Ta, Mo, W, etc.) having a small ionization tendency, a rod made of carbon, a wire, a mesh, a combination thereof, or the like can be used The aluminum foil feeding means 4 includes an aluminum foil feeding roller 4b for feeding an aluminum foil 4d hanging downward from an aluminum foil (aluminum foil) 4a wound in a roll shape to the inside of the negative electrode electrolyte 2c and immersing or pulling it up. And a motor 4c for driving and controlling the roller. The aluminum foil feed roller 4b is made of a metal (stainless steel, Ti, V, Ni, Zr, Mo, Ta, W, etc.) or carbon rods or pipes that are not easily affected by the electrolyte.

The control board 6 generally receives potential Vb+ of the positive electrode (+), the potential Vb− of the negative electrode (−), and the potential Vlim of the limit sensor 2d, and supplies the power supply voltages Vo+ and Vo− for external use and outputs the drive voltage Vmo of the aluminum foil feed motor 4b used in this cell.

Figure 3:
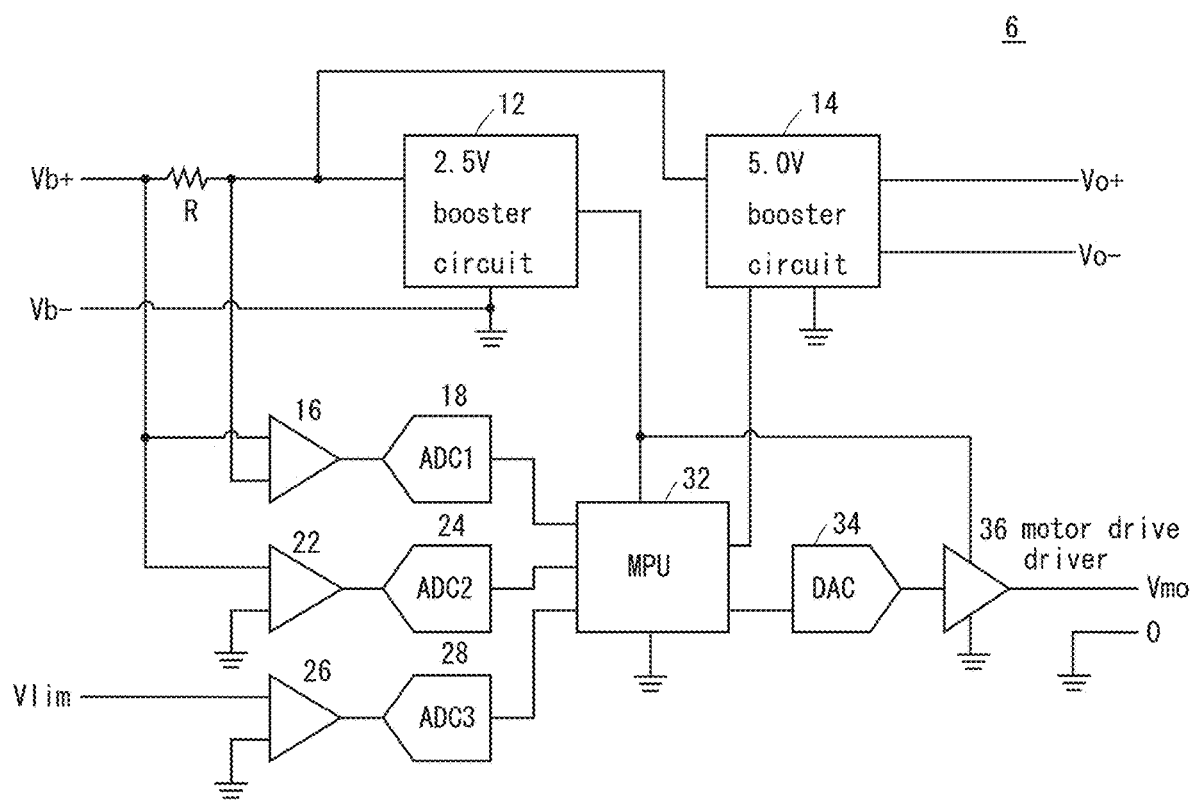
FIG. 3 is a circuit block diagram of the control board 6 of FIG. 2.

FIG. 3 is a circuit block diagram of the control board 6 of FIG. 2. The control board 6 includes a booster circuit 12 and a booster circuit 14. The booster circuit 12 boosts the cell voltage between the potential Vb+ of the positive electrode material 2e and the potential Vb− of the negative electrode electrolyte 2c of the cell body 2, and supplies it to the MPU 32 and the motor 4c. The booster circuit 12 is, for example, a DC/DC conversion circuit that generates 2.5 V required for driving the MPU 32. The booster circuit 14 is, for example, a DC/DC conversion circuit that generates 5.0 V used for an external USB or the like.

Further, the control board 6 includes an operational amplifier 16 and an A/D converter ADC1 (18) for measuring the cell current; an operational amplifier 22 and an A/D converter ADC2 (24) for measuring the cell voltage: an operational amplifier 26 and an A/D converter ADC3 (28) for measuring the potential Vlim of the sensor 2d; an MPU 32 for controlling the aluminum foil feed from the cell current/voltage and the potential Vlim of the limit sensor: and a motor drive driver 36 that outputs an aluminum foil feed motor drive voltage Vmo.

(Operation)

Refer to FIG. 2. On the negative electrode side 2-2, when the aluminum foil 4d is immersed in the negative electrode electrolyte 2c by the aluminum foil feed roller 4b, the reaction of the formula (2) occurs, and the electrons generated in the aluminum foil pass through the aluminum foil feed roller 4b, then pass through the negative pole of the control board 6, then supplied from the positive pole to the positive pole side 2e. On the positive electrode side 2e to which electrons are supplied, the reaction of the formula (1) occurs, and electric power is supplied between the positive electrode and the negative electrode of the control board 6 by the reaction of the equation (3) as a whole. The catalyst 2f promotes and continues the reaction of the formula (1).

If the internal impedance of the cell 2 is sufficiently small (for example, several mΩ to several Ω), the current generated in the cell 2 is proportional to the contact area between the aluminum foil 4d and the negative electrode electrolyte 2c. Area to be immersed in the electrolyte 2c (the length to be immersed if the width of the aluminum foil is constant, Namely, the "immersion length"). That is, the current output from the cell 2 can be controlled by controlling the "immersion length". That is, it is possible to perform constant current power generation by feedback control that senses the output current by the operational amplifier 16 and drives the aluminum foil feed roller 4b according to the increase or decrease of the output current (Constant current output operation).

Alternatively, since the output voltage is reduced by the internal resistance according to the current consumed by the load connected to the output terminal, the immersion length is set so that the output voltage of the cell 2 is sensed by the operational amplifier 22 and the output voltage is kept constant. By performing feedback control, it is possible to keep the voltage constant even when there is a load change (constant voltage output operation).

The feed speed of the motor 4c that drives the aluminum foil roller 4b can be controlled by the voltage of the DAC 34, that is, the voltage Vmo applied to the motor 4c. By making the Vmo output a pulse wave, the motor 4c can be driven intermittently. Power consumption can be reduced by driving the motor intermittently.

Further, the feed length L of the aluminum foil 4d can be obtained by integrating the feed speed v [mm/Sec] with respect to the motor applied voltage obtained in advance and the motor drive time t (pulse ON time) [Sec].

In general, the impedance of the control system of the metal negative electrode cell 10 shown in FIG. 2 increases because the electrolyte concentration decreases and becomes contaminated, reaction products accumulate, the catalyst of the positive electrode deteriorates over time. Accordingly, as the impedance increases, the immersion length of the aluminum foil gradually increases.

For this reason, the immersion length of the aluminum foil is controlled so as not to exceed the limit value of the control system of the metal negative cell 10. In the MPU 32, when the generated current is flowing, the potential of the limit sensor 2d (the value of ADC3 (28)) and the potential of the aluminum foil (the value of ADC2 (24)) when the aluminum foil 4d is located at the bottom of the cell is measured; and when the potentials are substantially the same (that is, the value of ADC3≈the value of ADC2), it is determined that the limit is reached, and the applied voltage Vmo to the motor 4c is set to zero. Since power can be generated for a while even in this state, an alarm signal (LED blinking or warning sound) may be issued to notify the user of power generation stop or to notify the maintenance time.

In the metal negative electrode cell 10 according to this embodiment, depending on the required cell output, the immersion length of the aluminum foil (proportional to the contact area between the aluminum foil 4d and the negative electrode electrolyte 2c, and eventually proportional to the current generated in the cell 2) can be controlled. In contrast, in the conventional aluminum-air cell 100 shown in FIG. 1, the entire aluminum electrode 104 is immersed in the electrolyte from the beginning. Since the metal negative electrode cell 10 according to the present embodiment remains in the necessary immersion length, self-discharge (corrosion) is less and energy generation efficiency becomes higher. In the case of standby state such as when no load is connected, the output can be reduced by reversely rotating the motor 4c and shortening the immersion length. The power required for the operation of the control board 6 is extremely small in the standby state, so may be required. Therefore, even if it waits for a long time, the consumption by corrosion of aluminum foil hardly arises.

Second Embodiment (Construction)

Figure 4:
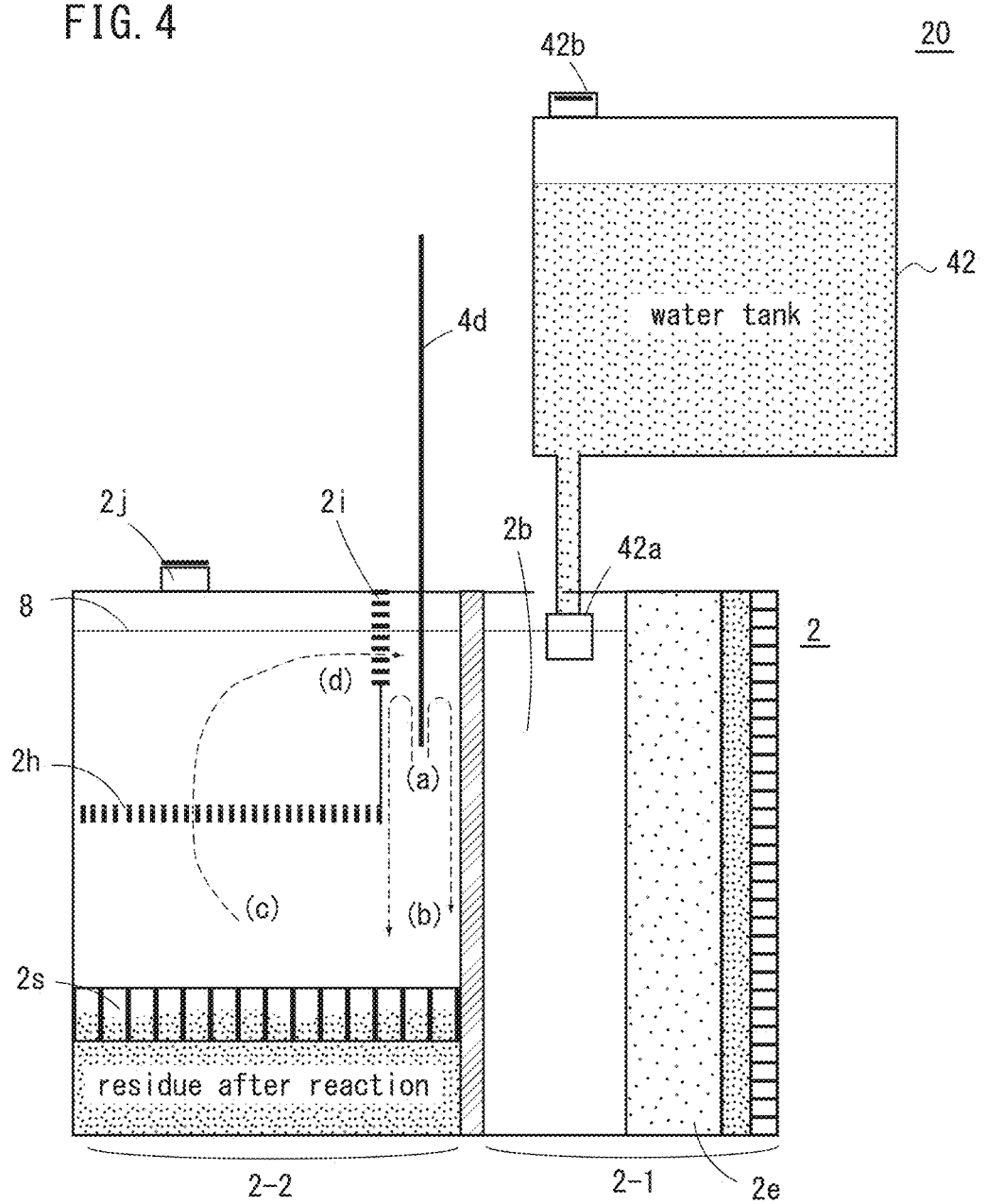
FIG. 4 is a diagram explaining the structure of the metal negative electrode cell 20 according to a second embodiment.

FIG. 4 is a diagram for illustrating a construction of a metal negative electrode cell 20 according to a second embodiment. Compared with the aluminum cell 10 according to the first embodiment, it is different in that the metal negative electrode cell 20 has the water tank 42 and several components (filters 2h, 2i, water filling port with gas vent cap 24b) of and the cell body 2 in order to maintain the amount of the positive electrode electrolyte solution.

The water tank 42 has a nozzle 42a with a float type water level adjustment valve that injects water into the positive electrode side 2-1 to keep the water level constant, and a water injection port 42b with an air intake valve cap.

Regarding the other points, the aluminum cell 20 is the same as the aluminum cell 10 unless otherwise described. That is, the metal negative electrode cell 20 is provided with the aluminum foil feeding means 4 and the control substrate 6 described in the metal negative electrode cell 10 shown in FIG. 2.

(Operation) In the metal negative electrode cell, 6 mol of water is required for 4 mol of aluminum as shown in the formula (1) in order to generate electric power. For this reason, when using all aluminum foil for electric power generation, there exists a possibility that the quantity of the water of the positive electrode electrolyte solution 2b may be insufficient in the aluminum cell 10 of FIG. 2

For this reason, the metal negative electrode cell 20 adopts a configuration capable of supplying water from the water tank 42 to the positive electrode side 2-1 as necessary. In principle, water may be supplied only to the positive electrode side 2-1 from the formula (1), but it may be supplied to the negative electrode side 2-2 and both.

In the metal negative electrode cell 20, when water is injected into the water tank 2 from the water injection port 42b with the air intake valve cap, the water is supplied to the positive electrode electrolyte tank 2-1 through the nozzle 42a with the float type water level adjustment valve. When the cathode electrolyte tank 2-1 is filled with water, the float type water level adjustment valve 42a is closed to stop the inflow of water, and water is stored in the water tank at a constant water level. When the amount of water in the positive electrode electrolyte 2b is insufficient, the float type water level adjustment valve 42a is opened and water flows again from the nozzle. By this mechanism, the electrolytic solution tank on the positive electrode side 2-1 is always filled with the electrolytic solution 2b without applying excessive pressure.

The electrolytic solution is previously prepared in a positive electrode electrolytic solution tank or can be prepared by storing with a powdered electrolyte in water tank, injecting water and dissolving the electrolyte in water.

On the other hand, on the negative electrode side 2-1, in the course of the reaction of the formula (2), for example, when the electrolyte is KOH, the reaction of the formula (4) occurs, and the water-soluble potassium tetrahydroxyaluminate ($K[Al(OH)_4]$) is generated. For this reason, the reaction rate is lowered by decreasing the concentration of KOH (i.e. pH concentration).

$$Al+3OH^-+KOH \rightarrow K[Al(OH)_4]+3e^+ \quad (4)$$

The metal negative electrode cell 20 employs a method of dissolving in advance in a large amount of water in order to secure the amount of KOH consumed.

By controlling the pH to 8-10, safety due to leakage etc. is secured.

On the negative electrode side 2-2, the aluminum foil 4d undergoes the reaction of the formula (4) at the position (a) in FIG. 4. The electrolytic solution convects along the broken line and passes through the precipitation filter 2s, the first filter 2h, and the second filter 2i. It is supplied to the vicinity of the immersed aluminum foil. Since $K[Al(OH)_4]$ has a property of being heavier than the electrolyte and has a property of being easily adsorbed, it is precipitated in the point (b) and is trapped by the precipitation filter 2s. The reaction of formula (5) takes place, and aluminum hydroxide is generated and KOH is returned to the electrolyte.

$$K[Al(OH)_4] \rightarrow Al(OH)_3 \downarrow + KOH \quad (5)$$

Third Embodiment (Construction)

Figure 5:
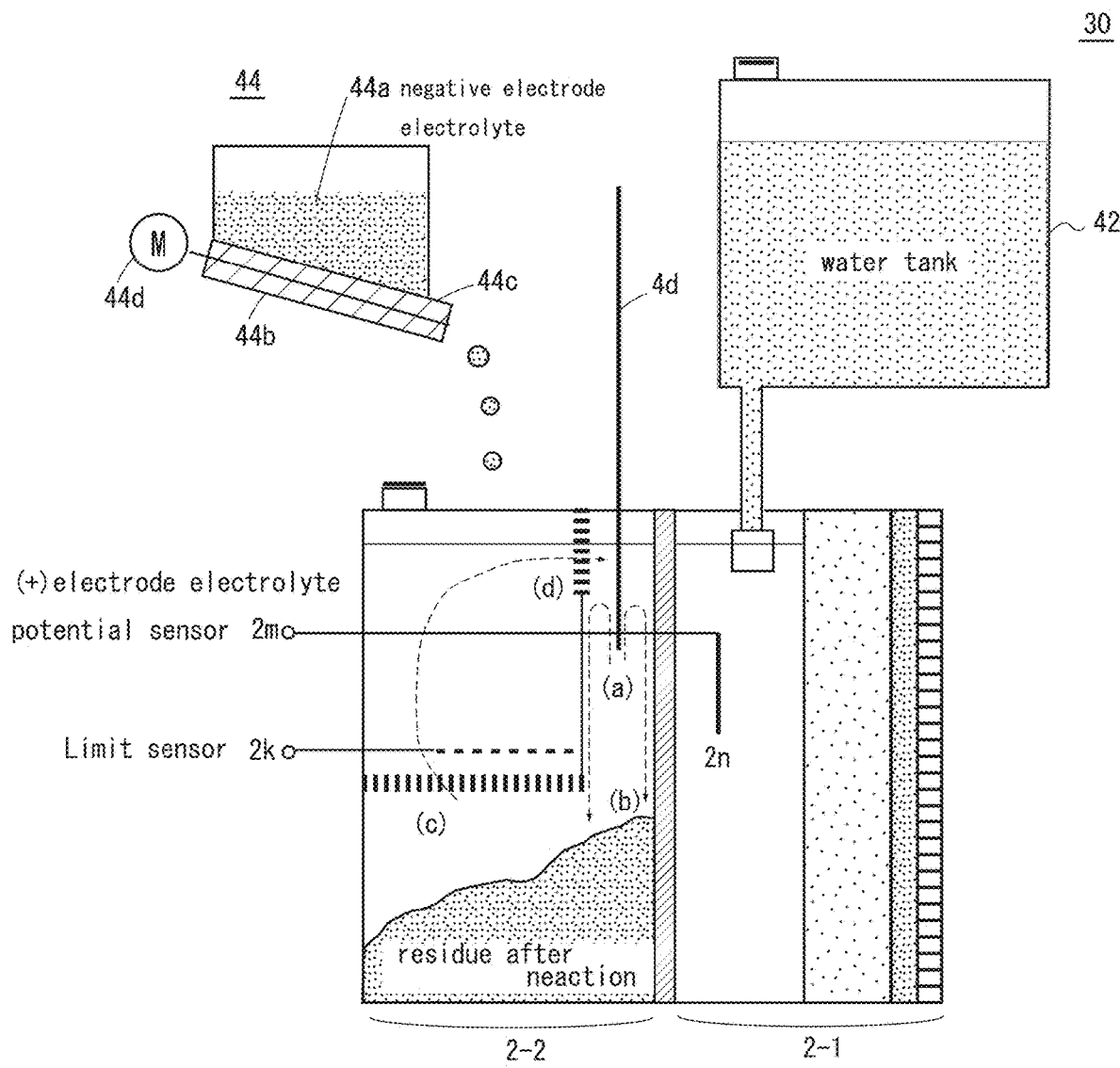
FIG. 5 is a diagram explaining the structure of the metal negative electrode cell 30 according to a third embodiment.

FIG. 5 is a diagram illustrating a construction of a metal negative electrode cell 30 according to a third embodiment. Compared with the aluminum cell 20 according to the second embodiment shown in FIG. 4, the aluminum cell 30 is different in that an electrolyte delivery mechanism 44 for controlling the concentration of the negative electrode electrolyte is attached.

The electrolyte delivery mechanism 44 discharges the negative electrode electrolyte 44a from the powder discharge nozzle 44c by the spiral powder delivery mechanism 44b to adjust the pH concentration of the negative electrode electrolyte. The spiral powder delivery mechanism 44b rotates a spiral screw by an electrolyte delivery motor 44d, and sends the powder or granular negative electrode electrolyte 44a in the electrolyte storage chamber to the powder discharge nozzle 44c.

Furthermore, the metal negative electrode cell 30 is provided with a connection terminal 2m of the positive electrode liquid potential sensor 2n and a connection terminal 2k of the limit sensor 2d in the cell main body 2. For the positive electrode liquid potential sensor 2n, an inexpensive metal (Ti, V, Zr, Mo, Ta, W, etc.) or carbon having a small ionization tendency, carbon, etc. are used.

Regarding the other points, the metal negative electrode cell 30 is the same as the aluminum cell 20 unless otherwise specified. That is, although not shown, the aluminum cell 30 includes the aluminum delivery stage 4, the control board 6, and the like described in the second embodiment.

(Operation)

In the metal negative electrode cell 20 according to the second embodiment, the KOH concentration decreases due to the reaction of the above formula (4) when trying to generate power using a large amount of aluminum foil. When the reaction of formula (5) is insufficient, KOH does not return to the electrolyte solution, so the pH concentration decreases and power generation stops.

On the other hand, in the metal negative electrode cell 30 according to the third embodiment, the electrolyte delivery mechanism 44 is provided, the deficient KOH is stored as powder in the electrolyte tank, and discharged from the powder discharge nozzle 44c to the electrolyte. By adding, the electrolyte concentration is maintained.

The electrolyte (KOH powder/particles) is discharged from the discharge nozzle 44c in proportion to the amount of rotation of the spiral screw 44b, falls into the electrolyte solution tank on the negative electrode side 2-2, and is mixed with the electrolyte solution. As for the discharge amount, the number of rotations of the screw 44b is controlled by the MPU 32 of the control board 6 in FIG. 3. Although not shown in the circuit block of the control board 6 in FIG. 3, for simplicity, it can be controlled by the drive time of the motor (that is, the discharge amount ∝drive time t). Here, the electrolytic solution potential on the negative electrode side (negative electrode liquid potential) can be detected by the potential difference {Vlim−(Vb−)} between the potential Vb− of the aluminum 4d on the negative electrode side 2-2 and the potential Vlim of the limit sensor. Since it is possible, the electrolytic solution concentration is maintained by feedback control of the motor driving time t so as to keep the negative electrode liquid potential within a certain range.

Generally, when the negative electrode liquid potential is 0.8 V or less, hydrogen is not generated from aluminum, but when it is 1.2 V or more, it reacts violently and consumes aluminum. Therefore, desirably, by controlling the concentration so as to always maintain 0.8 V to 0.9 V, consumption of aluminum can be minimized and power generation efficiency can be increased.

In the metal negative electrode cell 30 according to the third embodiment, only a negative electrode electrolyte (for example, KOH) can be added, and therefore the pH concentration cannot be lowered. However, although not shown in the figure, the pH concentration can be lowered by adding an acidic electrolyte for neutralization (acetic acid, citric acid, etc.) by the same mechanism. In this embodiment, a solid electrolyte is used, but a mechanism for dropping a liquid electrolyte may be used.

As described above, since the output current of the cell can be managed by the immersion length of the aluminum foil in the electrolyte, it is possible to generate power in an optimal state according to the output by controlling it together with the negative electrode liquid potential.

The positive electrode liquid potential sensor 2n can measure the positive electrode side electrolytic solution potential (positive electrode liquid potential=positive electrode liquid potential sensor voltage) Vpe. The potential of the positive electrode (electromotive voltage of the positive electrode) Vpee can be obtained from the potential difference {(Vb+)−Vpe} between the positive electrode terminal potential Vb+ and the positive electrode liquid potential Vpe. The deterioration state of the air electrode can be monitored by the electromotive voltage Vpee of the positive electrode. The electromotive voltage of the positive electrode is 0.4 V, for example, as shown in equation (1), but when it deteriorates, it drops to 0.4 V or less. This deterioration increases as the reaction rate of the expression (1) decreases due to a decrease in oxygen concentration, a decrease in electrolyte concentration, a decrease in catalytic reaction, a decrease in temperature, and the like, and increases as more current flows.

In order to prevent the deterioration, it is effective to reduce the generated current or stop the power generation. Therefore, the potential Vpee of the positive electrode is constantly measured to limit the generated current to a range where the deterioration does not proceed. The generated current limiting process can be realized by limiting the output current of the 5V booster circuit 14 with the MPU 32 of FIG. 3. The positive electrode potential Vpe can be easily measured by the MPU 32 with a circuit (amplifier 26 and ADC 3 (28)) similar to Vlim in the block diagram of FIG. 3.

In addition, since the reaction efficiency of the formula (1) at the positive electrode also changes depending on the concentration of the positive electrode electrolyte, a positive electrode electrolyte delivery mechanism may be employed in the same manner as the negative electrode to control the electrolyte concentration of the positive electrode so that the reaction efficiency is maximized. Vpee can be used for concentration management.

Fourth Embodiment (Construction)

Figure 6:
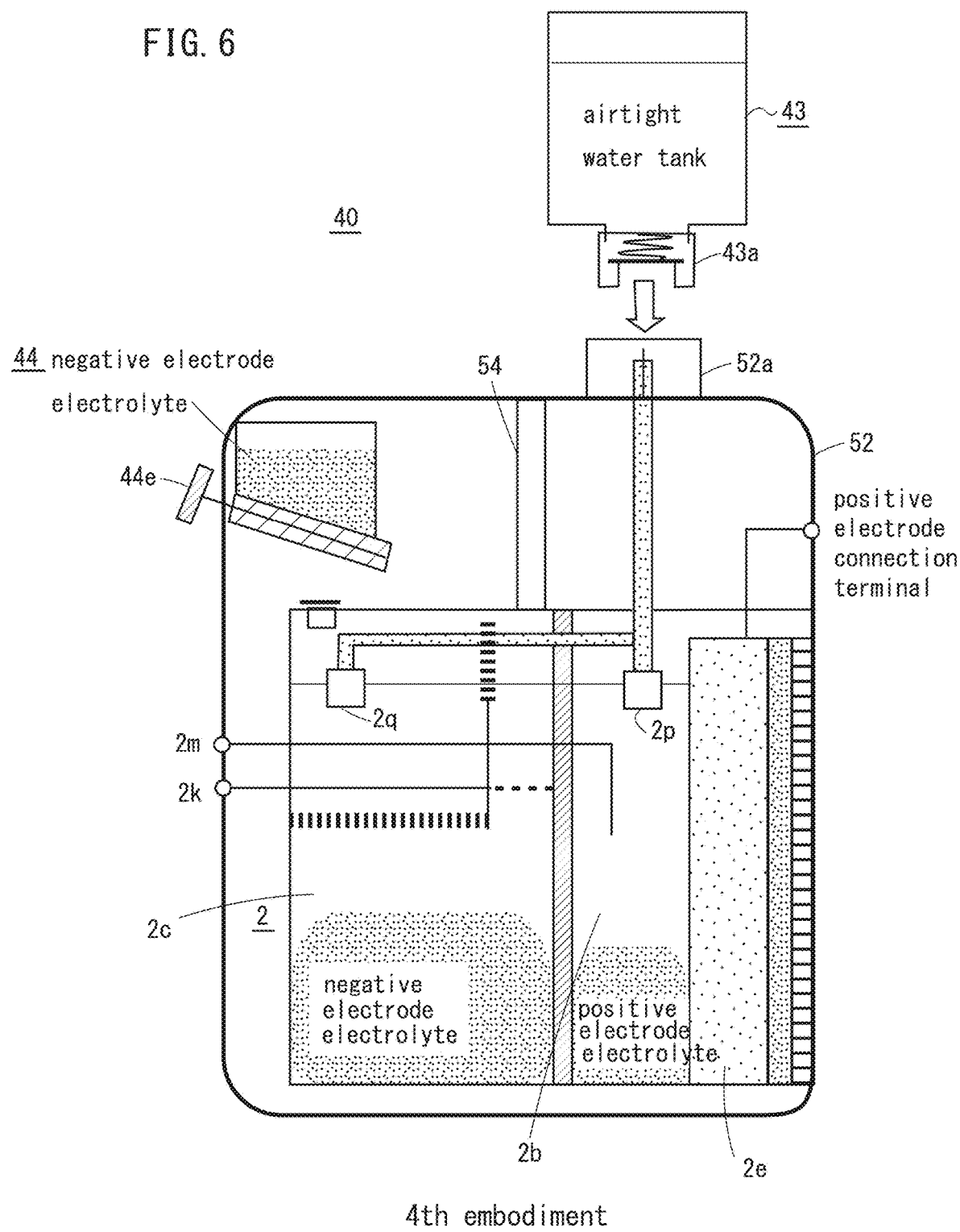
FIG. 6 is a diagram explaining the structure of the metal negative electrode cell 40 according to a fourth embodiment.

FIG. 6 is a diagram illustrating a construction of a metal negative cell 40 according to a fourth embodiment. Compared with the metal negative cell 30 according to the third embodiment shown in FIG. 5, the metal negative cell 40 is different in that the cell body 2 and the electrolyte delivery mechanism 44 are integrated and accommodated in the reaction cassette 52. The reaction cassette 52 is provided with an aluminum foil insertion guide 54, from which the aluminum foil 4d is immersed in the negative electrode electrolyte 2c. Further, the metal negative cell 40 is provided with a sealed water tank 43 instead of the water tank 42. Although not shown, the control substrate 6 is installed outside the reaction cassette 52.

Regarding other points, the metal negative electrode cell 40 is the same as the metal negative electrode cell 30 unless otherwise specified. That is, although not shown, the aluminum cell 40 includes the aluminum foil feeding means 4, the control board 6, and the like described in the third embodiment.

In order to realize these differences, an electrolyte delivery motor connection gear (flat gear) 44e can be connected in gear with a delivery motor (not shown). The positive electrode potential sensor connection terminal 2m, the limit sensor connection terminal 2k, and the positive electrode terminal+ are electrically connected to each terminal of their main body through a connector mechanism (not shown), respectively.

On the other hand, the sealed water tank 43 can be directly supplied with water from a water supply or the like by making the water tank water supply cap 43a detachable from the water inlet 52a of the reaction cassette 52 (for example, screw type). By attaching the water tank water supply cap 43a, the tank 43 can be sealed. At this time, since the water tank sealing valve of the water tank water supply cap 43a is pressed against the cap (downward in the figure) by the valve sealing spring, water does not leak.

When the sealed water tank 43 is set in the reaction cassette 52, the water tank water supply cap 43a is set in the water receiver 52a of the reaction cassette 52 as shown by the arrow in the figure.

(Operation)

The separator 2a and the positive electrode material 2e are incorporated in the reaction cassette 52. In advance, the negative electrode electrolyte is stored in the negative electrode side 2-2, the positive electrode electrolyte is stored in the positive electrode side 2-1, and the negative electrode electrolyte is stored in the electrolyte delivery mechanism 44. In this case, for example, by covering the entire reaction cassette 52 with an airtight structure and covering it with a wrap film, it is possible to prevent the intrusion of water and excess air, and it can be stably stored for a long period of time.

An electrolyte delivery motor 44d is connected to the electrolyte delivery motor connection gear 44e of the reaction cassette 52. The positive electrode potential sensor connection terminal 2m, the limit sensor connection terminal 2k, and the positive electrode terminal are electrically connected to each terminal of the control board 6, respectively. The sealed water tank 43 is connected to the water supply port 52 a of the reaction cassette 52.

When the reaction cassette 52 is set and a sealed water tank filled with water is set, water supply is started. Water is supplied from the nozzles 2p and 2q with float type water level adjusting valves to the positive electrode reaction tank and the negative electrode reaction tank, respectively. The float-type water level adjustment mechanism closes the valve when the water level reaches a certain water level, and the water level is always kept constant. When the valve of the nozzle is closed, the water receiver 52a is filled with water, thereby closing the inlet of the sealed water tank and stopping the supply of water from the sealed water tank. Due to this mechanism, water does not overflow from the water receiver, and a constant water level is maintained in the water receiver. Therefore, the pressure to the water level adjustment valve is kept constant, so that the water level can be adjusted with high accuracy.

With the above function, safety can be improved because the reaction cassette 52 can be replaced without the user directly touching the electrolytic solution when power generation is completed. Further, power generation can be continued quickly, and the reaction cassette 52 can be recycled. In the reaction cassette 52, the separator 2a and the positive electrode material 2e are incorporated as described above. The negative electrode side 2-2 has a negative electrode electrolyte, the positive electrode side 2-1 has a positive electrode electrolyte, and the electrolyte delivery mechanism 44 has a negative electrode, but some of them may be stored on the body side.

By these, the same operation as that of the metal negative electrode cell 30 of 3rd Embodiment is performed.

Fifth Embodiment (Construction)

Figure 7:
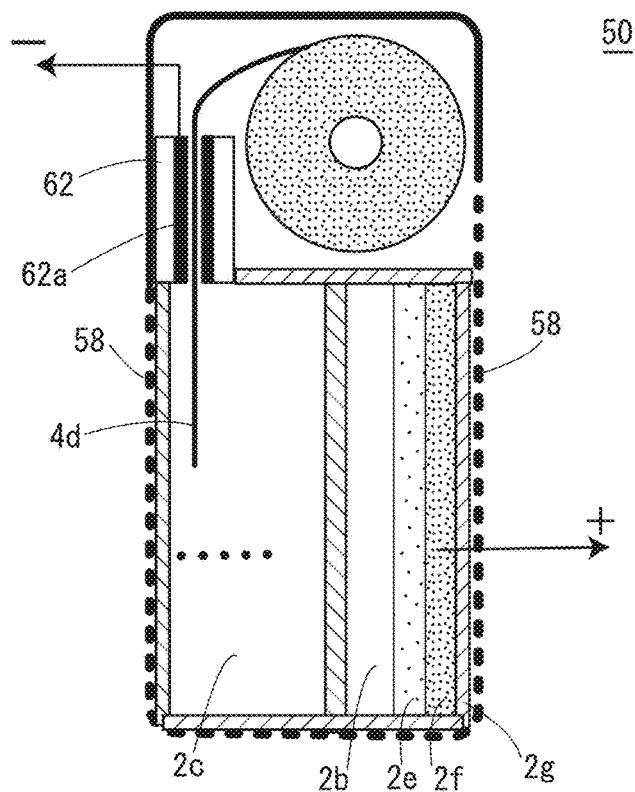
FIG. 7 is a diagram explaining the structure of the sealing type metal negative electrode cell 50 according to a fifth embodiment.

FIG. 7 is a diagram illustrating a configuration of a sealed metal negative cell 50 according to a fifth embodiment. Compared with the metal negative batteries 10 to 40 according to the first to fourth embodiments, the difference is that the whole cell is a sealed type. In order to realize a sealed cell, the reaction part of the cell is surrounded by a porous PTFE film 58. As a result, the generated gas is released to the outside through the porous film, regardless of the direction in which the cell is installed (upside down or sideways), but the electrolyte does not leak to the outside.

The motor unit 62 is an ultrasonic motor, and the sliding surface 62a of the motor is conductively processed, and the sliding surface and the aluminum foil 4d are brought into close contact with each other so as to be electrically connected to the aluminum foil 4d. Thereby, leakage of the electrolyte is prevented. In other respects, the aluminum cell 50 is the same as the aluminum cell 10 to 40 according to the other embodiments unless otherwise specified.

(Operation)

In the sealed metal negative cell 50, the positive electrode electrolyte 2b, the negative electrode electrolyte 2c, and the like are previously injected into the cell. The aluminum foil end 4d is inserted into the ultrasonic motor 62, but is isolated from the electrolytic solution 2c. In this state, the cell can be stably stored for a long period of time by covering the entire cell with a wrap film, aluminum foil, or the like.

When the ultrasonic motor 62 is activated by a spare cell (not shown) such as a button cell, the aluminum foil 6d is immersed in the electrolytic solution 2c, and power generation is started. Since the aluminum foil 4a cannot be replaced, it is disposable, but since there is no liquid leakage, it can be used for various purposes. For example, it can be reduced in size and carried, or can be increased in size and mounted on a moving body such a vehicle.

Moreover, since it is a sealed type, it is possible to contain odors even if an organic electrolyte is used as the electrolyte. Similarly, since it is a hermetically sealed type, it is possible to prevent water from entering, so there is no need to specialize in an aqueous electrolyte solution, and there is a possibility of development as an aluminum secondary cell.

Sixth Embodiment (Construction)

Figure 8:
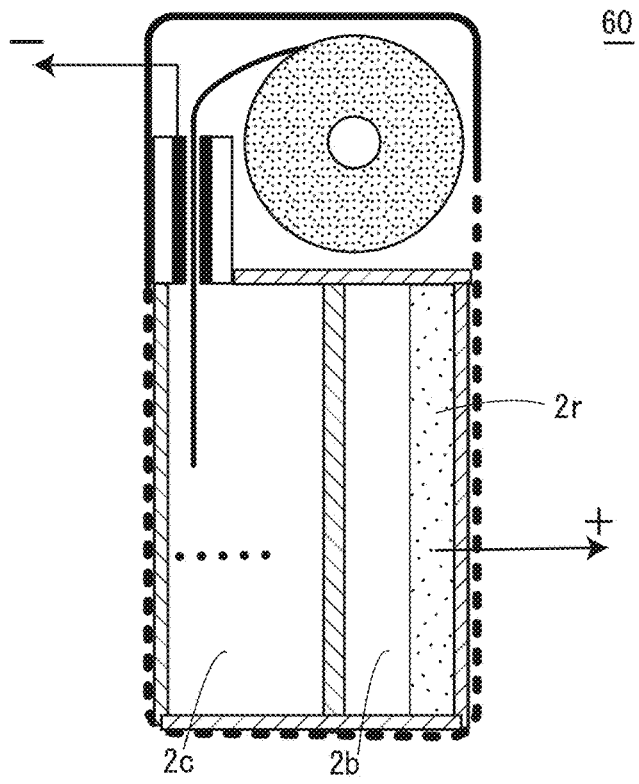
FIG. 8 is a diagram which shows the structure of the metal negative electrode cell 60 according to a sixth embodiment.

FIG. 8 is a diagram illustrating a configuration of a metal negative electrode cell 60 according to a sixth embodiment. The metal negative electrode cell 60 is a cell in which the positive electrode composed of the air electrode of the metal negative electrode cell 50 according to the fifth embodiment shown in FIG. 7 is replaced with the current collector electrode 2r. In the metal negative electrode cell 50, the air electrode composed of the positive electrode material 2e, the catalyst 2f, and the porous PTFE film 2g for taking in air is replaced with the current collector 2r, and an oxide such as manganese dioxide is added to the positive electrode electrolyte 2b; whereby it functions as a cell.

(Operation)

In general, when trying to increase the output of an air cell, it requires a large area because the reaction efficiency of the air electrode is poor. So, it has been difficult to achieve a compact size. In the present embodiment, a large current can be caused to flow by using an oxide having a reducing ability such as manganese dioxide for the positive electrode 2r. The same operation as in the first to fifth embodiments is possible except that the reaction of the positive electrode is different. When manganese dioxide and KOH are used for the positive electrode electrolyte, the reaction of formula (6) occurs instead of formula (1). Since no air is required, the reaction is fast and therefore a large current can flow.

$$MnO_2 + H_2O + e^+ \rightarrow MnOOH + OH^- \quad (6)$$

In this embodiment, since the electrolyte solution requires an oxide or the like, the energy density per weight is lowered. However, except for releasing the generated gas, it is a sealed type and can be downsized. In addition, since air is unnecessary, there are few restrictions on the use environment.

Seventh Embodiment (Construction)

Figure 9:
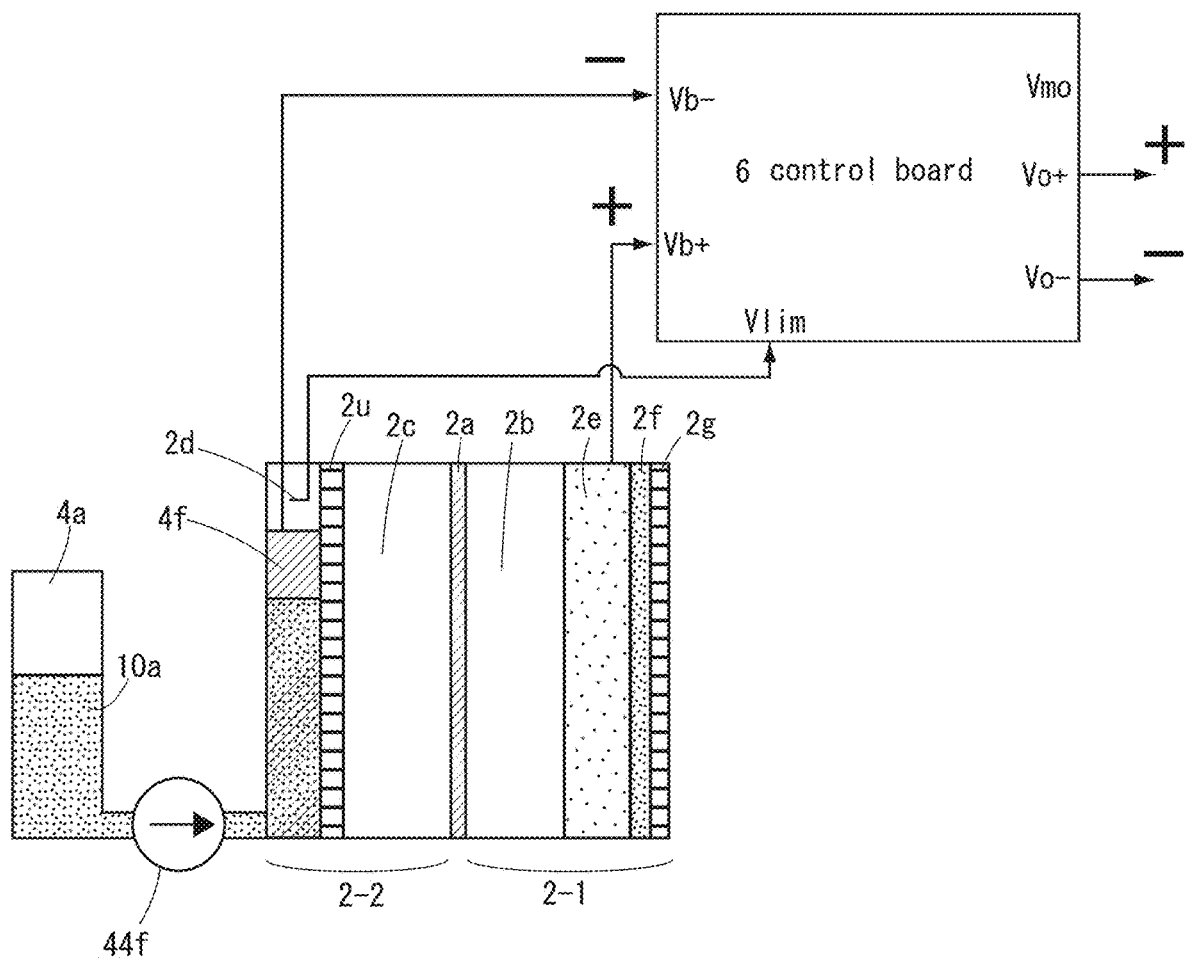
FIG. 9 is a diagram which shows the structure of the sol metal negative electrode cell 70 according to a seventh embodiment.

FIG. 9 is a diagram illustrating a configuration of a sol metal negative electrode cell 70 according to a seventh embodiment. The sol metal negative electrode cell is a cell in which the negative electrode made of the aluminum foil of the metal cell 10 according to the first embodiment shown in FIG. 2 is replaced with the sol metal 10a. The sol metal 10a stored in the negative electrode material storage tank 4e is pushed into the negative electrode current collector 4f by the negative electrode material feed pump 44f, thereby functioning as a cell.

In order to reduce self-discharge, the surface of the metal particles and metal powder used for the sol metal 10a may be coated with a metal having a low ionization tendency (for example, zinc, indium, tin, etc.). Also, it may be coated with a polymer containing conductive materials such as carbon and a metal oxide (graphite, carbon black, acetylene black, cobalt oxide, cobalt oxyhydroxide, silver oxide, silver oxide nickel, nickel oxyhydroxide, and indium oxide) or hybridizing them. Further, they may be mixed with each other. As the solubilizing agent, starch, cellulose derivatives, emulsifiers and the like having a thickening effect can be used, and conductive particles or fine particles may be included. The conductive particles have an effect of reducing cell resistance. The negative electrode current collector 4f can be made of porous, sponge-like, mesh-like, felt, knitted metal (stainless steel, Ti, V, Ni, Zr, Mo, Ta, W, etc.) or carbon.

(Operation)

In the first to sixth embodiments, a solid metal is used for the negative electrode. However, in the case of a solid, the degree of freedom in the shape and size of the negative electrode is poor, and the extrusion structure is also limited. In addition, when a plurality of cells are connected in series or in parallel, an independent electrode and a drive system are required, resulting in a disadvantage that the number of parts increases and the size increases.

In the present embodiment, a sol metal 10a obtained by kneading metal particles, metal powder, and metal fine powder with a solubilizing agent as a negative electrode metal is used, and the sol metal 10a is extruded from a storage tank into the negative electrode current collector 4f to obtain a negative electrode current collector. By reacting in the body 4f, it can be handled in the same manner as a solid metal. That is, for example, when the sol metal 10a passes through the porous metal, the reaction of the formula (2) occurs, and the generated electrons are passed to the current collector to generate power. The limit sensor is used to detect that the sol metal 10a is full in the reaction vessel by detecting that the potential difference between the limit sensor and the negative electrode current collector 4f becomes zero.

Operation Common to All Embodiments

Figure 10:
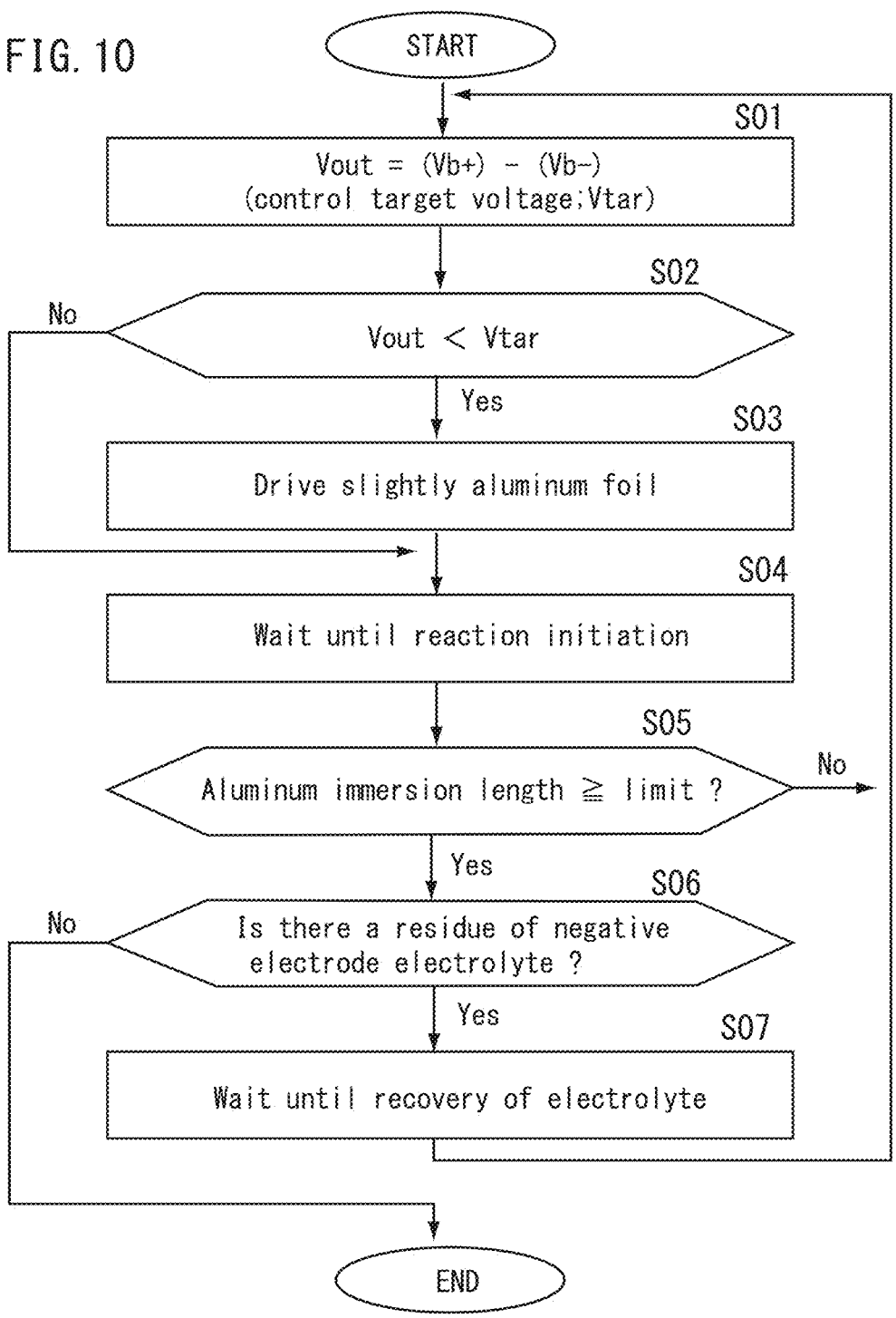
FIG. 10 is a flowchart of feed control of aluminum foil.
Figure 11:
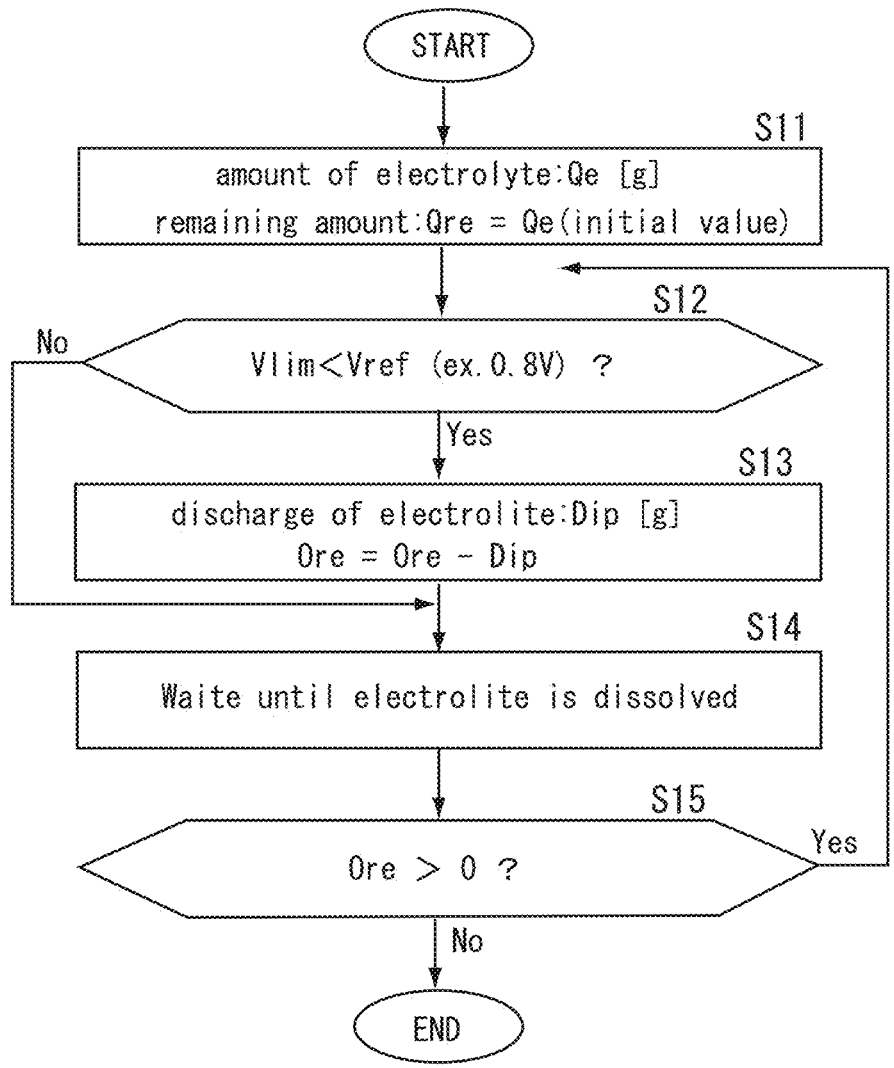
FIG. 11 is a flowchart regarding feed control of aluminum foil in FIGS. 5 and 6.
Figure 12:
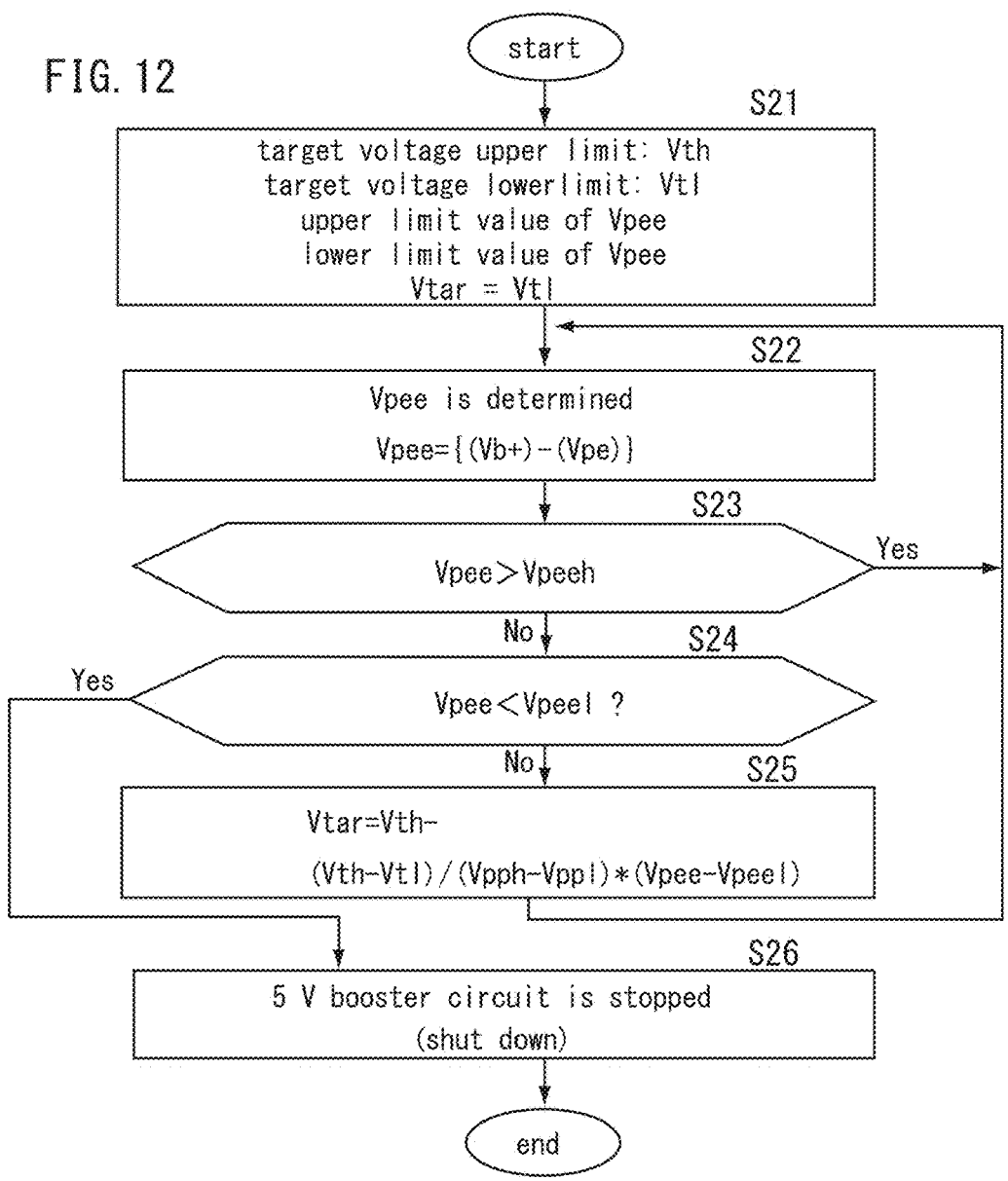
FIG. 12 is a flowchart regarding positive electrode potential control.

The operation common to the embodiments described above will be described. Specific processing is shown in the flowcharts of FIGS. 10 to 12. These processes are executed by the MPU 32.

FIG. 10 is a flowchart regarding aluminum foil feed control.

In step S01, the interelectrode voltage is obtained from the positive electrode potential Vb+ and the negative electrode potential Vb− in FIG. 2 by Vout={(Vb+)−(Vb−)}.

In step S02, it is determined whether or not the obtained Vout is lower than a preset control target voltage Vtar voltage.

In step S03, if Vout<Vtar, in order to increase the Vout voltage, a slight amount of aluminum foil (for example, about 1 to several mm) is driven and sent out to the electrolyte. Otherwise, the process proceeds to step S04.

In step S04, when the aluminum foil is immersed in the electrolytic solution and the reaction is promoted, Vout increases. Therefore, the process waits until the reaction starts. The waiting time is determined by experiment, but is about several seconds to several tens of seconds.

In step S05, it is determined whether the immersion length of the aluminum foil in the electrolytic solution exceeds the limit value. In this determination, the difference between the limit sensor potential Vlim and Vb− potential {Vlim−(Vb−)} is taken, and when the potential difference becomes zero, it is determined that the limit value is exceeded. If the limit value is not exceeded, the process returns to step S01.

In step S06, the remaining amount of the negative electrode electrolyte is checked. If there is none, the use of the cell is terminated. If there is, the process returns to step S01.

FIG. 11 is a flowchart regarding management of the electrolyte solution of the negative electrode in FIGS. 5 and 6.

In S11, it is assumed that an amount of electrolyte necessary for the initial operation is loaded in the cell or cassette in advance, and an electrolyte having a necessary concentration is generated by filling the cell or cassette with water. At this time, the electrolyte tank shown in FIGS. 6 and 7 is filled with the negative electrode electrolyte, and the remaining amount is Qe [g]. Also, the remaining amount variable for control is Qre, and the initial value is represented by Qe.

In step S12, the potential Vlim of the limit sensor is compared with a predetermined reference potential Vref. The potential Vlim of the limit sensor is the potential of the negative electrode electrolyte based on the aluminum foil. In general, the reference potential Vref is set to 0.7 to 1.0 V, which hardly generates hydrogen.

In step S13, if the limit sensor potential Vlim is lower than the reference potential Vref, the electrolyte concentration is considered to be small, and the electrolyte is discharged. Subtract the discharge amount Drip from Qre (Qre=Qre−Drip). Drip is determined by experiment.

In step S14, the process waits until the electrolyte is dissolved in the electrolytic solution. The waiting time can be shortened by making the electrolyte into powder or granules.

In step S15, it is determined whether there is a remaining amount of electrolyte and whether the variable Qre is greater than zero. If there is a remaining amount, return to S12 and repeat. If there is no remaining amount, this process is terminated.

Figure 13:
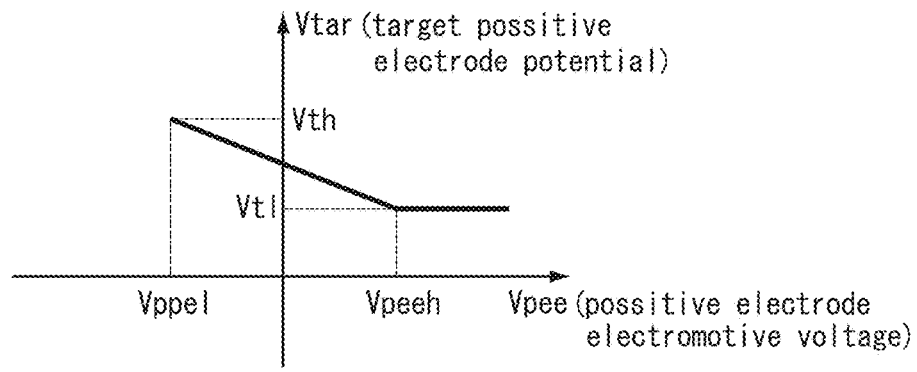
FIG. 13 is a graph showing a target positive electrode potential $V_{TAR}$ characteristic using a positive electrode electromotive voltage $V_{PEE}$ as a parameter.

FIG. 12 is a flowchart regarding positive electrode potential control. This process is a process for setting the control target voltage Vtar between the positive electrode and the negative electrode of the cell to a voltage as shown in FIG. 12. FIG. 13 is a graph showing the target positive electrode potential Vtar characteristic using the positive electrode electromotive voltage Vpee as a parameter. That is, Vtar is a function in which the positive electromotive voltage Vpee (positive voltage Vb+−positive electrode liquid potential sensor voltage Vpe) decreases with a constant gradient between Vpeel and Vpeeh as shown in the figure and becomes a constant value of Vtl when it exceeds Vpeeh. When VPEE is equal to or less than VPEEL, the overdischarge state occurs, so the discharge is stopped.

In step S21, the setting range of the Vtar voltage, that is, the target voltage upper limit value is set to Vth, and the target voltage lower limit value is set to Vtl. Further, the upper limit voltage of Vpee (positive electrode voltage−positive electrode liquid potential sensor voltage) is Vpeeh, and the lower limit voltage is Vpeel. Vtl and Vth are used to set the normal operating range of the cell. Normally, any value from 0.9V to 1.8V is set by experiment. Vpeel and Vpeeh are the voltages of the reaction of the formula (1), and usually set a value of 0 to 0.4 V.

In step S22, Vpee is determined.

In step S23, Vpee and Vpeeh are compared. If Vpee>Vpeeh, Vtar does not change and returns to S22.

In step S24, Vpee and Vpeel are compared. If Vpee<Vpeel, the process proceeds to S26. If Vpee>Vpeel, the process proceeds to S25.

In step S25, Vtar is obtained by the following equation and repeated from S22.

$$Vtar = Vth - (Vth - Vtl)/(Vpeeh - Vpeel)*(Vpee - Vpeel) \quad (7)$$

In step S26, the 5.0 V booster circuit of FIG. 3 is stopped and the entire process is shut down.

Features Common to all Embodiments

Features common to the embodiments described above will be described.

In the first to fifth and seventh embodiments, the objects of these embodiments are metal negative cells in which the positive electrode is an air electrode. In the sixth embodiment, the cathode positive electrode is replaced with a positive electrode active material and a current collector. The characteristics of these metal batteries include, for example, the following items.

(1) This is a metal negative electrode cell having a metal automatic feeding mechanism.

According to one or more of the following parameters, (a) surface water level or amount of electrolyte, (b) length (immersion length) or area immersed in metal electrolyte by metal feed. (c) in electrolyte It is a metal negative electrode cell which can control at least one of the amount of electrolyte (namely, electrolyte concentration).

(i) Generated current, generated voltage, generated power, accumulated generated power or operating time (ii) Electrolyte temperature, atmospheric temperature, metal electrode temperature (iii) pH value of the electrolytic solution (iv) Electric conductivity of the electrolytic solution (electrolytic solution resistance value)

(v) The potential of the positive electrode electrolyte or the potential of the negative electrode electrolyte with respect to the positive electrode, negative electrode, or separator potential (vi) Metal usage (reacted metal) or cumulative feed time (3) When the main component of the electrolyte is a solid, it is a metal negative electrode cell that can be maintained in a dry state for a long period of time and can generate and start an electrolyte by injecting a solvent.

(4) It is a metal negative electrode cell which can use aqueous solutions, such as water and seawater, for the said solvent.

(5) In the metal negative electrode cell, the reaction part can be formed into a cassette type, an electrolyte or an electrolytic solution necessary for power generation can be supplied, and waste after the reaction can be recovered by cassette replacement.

Advantages/Effects of these Embodiments (1) There is no leakage of electrolyte or self-discharge, and long-term storage is possible.

(2) The microcomputer can optimally control the immersion length of the metal in the electrolyte solution dependent on the output, whereby efficient power generation can be continued and a standby state for a long time (maintaining almost zero load current during operation) can be maintained.

A cell using an aluminum foil as the negative electrode material has the following effects.

(i) A large amount of power can be obtained with a single aluminum foil, despite being compact and lightweight. Moreover, since it is replaceable, it has become possible to generate power for a long time.

(ii) Since it is possible to use an aluminum foil for cooking used in general households instead of a special aluminum foil, it is possible to keep an electrode material on a regular basis, although a separate main body and an electrolyte cassette are necessary.

(iii) Since the electrolyte and the reaction vessel are integrated in a cassette, power can be generated simply by setting aluminum foil in the device and injecting water or seawater, which can be used by anyone at any time, anywhere. A large-capacity cell that can be stored for a long time can be provided.

(4) With the above, metal negative batteries can be provided for applications such as emergency power supplies that can be stored for a long period of time, light and compact power supplies in non-electrified areas, and quiet and non-hazardous power supplies in the outdoors and construction sites. It became so. In addition, by increasing the size, it can also be used as an auxiliary power source or a UPS power source for EV cars.

(5) By adopting a hermetically sealed structure, it is possible to realize a compact structure, and it is possible to apply it to portable use and in-vehicle use.

(6) By using sol metal, it has become easy to supply metal from a single location to a plurality of cell cells connected in series and parallel, increase output, or increase size.

REFERENCE SIGNS LIST

2: cell body, 2-1: positive electrode side, 2-2: negative electrode side, 2a: separator, 2b: positive electrode electrolyte, 2c: negative electrode electrolyte, 2d: limit sensor, 2e: positive electrode material, 2f: catalyst, 2g: porous membrane, 2h: filter, 2i: filter, 2j: water inlet with a gas vent valve cap, 2k: limit sensor connection terminal, 2m: connection terminal, 2n: positive electrode potential sensor, 2p: nozzle, 2q: nozzle, 2r: positive electrode current collector electrode, 2s: precipitation filter, 2t: residue after reaction, 2u: porous film, 4: aluminum foil feeding means, 4a: aluminum foil (aluminum foil), 4b: aluminum foil feeding roller, 4c: motor, 4d: aluminum foil, 4e: negative electrode material storage tank, 4f: negative electrode current collector, 6: control board, 8: liquid surface, 10: metal negative cell, 10a: sol metal, 12: booster circuit, 14: booster circuit, 16: operational amplifier, 20: aluminum cell, 22: operational amplifier, 24: ADC2, 26: operational amplifier, 28: ADC3, 30: Metal negative cell, 32: MPU, 34: DAC, 36: Motor drive driver, 40: Metal negative cell cassette, 42: Water tank, 42a: Nozzle with float type water level control valve, 42b: Water inlet with intake suction valve cap, 43: Sealed water tank, 43a: Water tank water supply cap, 44: Electrolyte delivery mechanism, 44a: Negative electrode electrolyte, 44b: Spiral powder delivery mechanism, 44c: Powder discharge nozzle, 44d: Electrolyte delivery motor, 44e: Electrolyte Sending motor connection gear, 44f: Negative electrode material pressure feeding port 44f, 50: metal negative cell, 52: reaction cassette, 52a: water inlet with water receptacle, 54: aluminum foil insertion guide, 58: porous PTFE membrane, 60: sealed metal negative cell, 62: ultrasonic motor, 62a: sliding surface, 100: aluminum air cell principle diagram, 102: positive electrode, 104: aluminum electrode, 106: electrolyte, 108: separator

The invention claimed is:

1. A metal negative electrode cell having a positive electrode, a metal negative electrode, and an electrolytic solution, the metal negative cell comprising:
   an immersion means for controlling the area of the metal negative electrode immersed in the electrolytic solution at the time of use, by means of which the metal negative electrode is extruded from or pushed back toward the electrolytic solution, or by means of which the liquid level of the electrolytic solution of the metal negative electrode is raised or lowered, varies the immersion length of the metal negative electrode according to demand,
   a separator that separates the electrolytic solution into a positive electrode side electrolytic solution and a negative electrode side electrolytic solution, and
   an electrolyte delivery mechanism for delivering a negative electrode electrolyte to the negative electrode electrolytic solution and/or an electrolyte delivery mechanism for delivering a positive electrolyte to the positive electrolytic solution, whereby the concentration of the negative and/or positive electrolyte solution is controlled.

2. The metal negative electrode cell according to claim 1, wherein the electrode of the metal negative electrode is made of a sol metal.

3. The metal negative electrode cell according to claim 1, wherein the electrode of the metal negative electrode is made of a metal of aluminum, magnesium, zinc, lithium, or an alloy or mixed composition thereof.

4. The metal negative electrode cell according to claim 1, wherein an output voltage of the metal negative electrode cell or the electromotive force of the negative electrode is detected, and the output is controlled by controlling an area of the metal negative electrode to be immersed in the electrolytic solution in accordance with the increase or decrease of the output voltage.

5. The metal negative electrode cell according to claim 1, further comprising a water level adjusting mechanism for the electrolytic solution, whereby the electrolytic solution is maintained at a constant water level.

6. The metal negative electrode cell according to claim 1, wherein the residue after the reaction of the negative electrode is precipitated by a precipitation filter.

7. The metal negative electrode cell according to claim 1, comprising;
   a reaction cassette in which a portion of the metal negative electrode cell main body and a portion of the electrolyte delivery mechanism are housed in an integrated manner.

8. The metal negative electrode cell according to claim 1, wherein
   the metal negative electrode cell has a hermetically sealed structure using a material that permeates a generated gas but does not leak the negative or positive electrolyte.

9. A metal negative electrode cell having a positive electrode, a metal negative electrode, and an electrolytic solution,
   the metal negative electrode cell comprising: means for extruding from or pushing back the metal negative electrode linearly towards the electrolytic solution for controlling the area of the metal negative electrode immersed in the electrolytic solution at the time of use according to demand.

10. The metal negative electrode cell according to claim 9,
wherein the electrode of the metal negative electrode is made of a sol metal.

11. The metal negative electrode cell according to claim 9,
wherein the electrode of the metal negative electrode is made of a metal of aluminum, magnesium, zinc, lithium, or an alloy or mixed composition thereof.

12. The metal negative electrode cell according to claim 9,
wherein an output voltage of the metal negative electrode cell or the electromotive force of the negative electrode is detected, and the output is controlled by controlling an area of the metal negative electrode to be immersed in the electrolytic solution in accordance with the increase or decrease of the output voltage.

13. The metal negative electrode cell according to claim 9, further comprising a water level adjusting mechanism for the electrolytic solution, whereby the electrolytic solution is maintained at a constant water level.

14. The metal negative electrode cell according to claim 9, wherein the residue after the reaction of the negative electrode is precipitated by a precipitation filter.

15. The metal negative electrode cell according to claim 9 further comprising:
a separator that separates the electrolytic solution into a positive electrode side electrolytic solution and a negative electrode side electrolytic solution, and
an electrolyte delivery mechanism for delivering a negative electrode electrolyte to the negative electrode electrolytic solution and/or an electrolyte delivery mechanism for delivering a positive electrolyte to the positive electrolytic solution, whereby the concentration of the negative and/or positive electrolyte solution is controlled.

16. The metal negative electrode cell according to claim 9, comprising;
a reaction cassette in which a portion of the metal negative electrode cell main body and a portion of the electrolyte delivery mechanism are housed in an integrated manner.

17. The metal negative electrode cell according to claim 9, wherein
the metal negative electrode cell has a hermetically sealed structure using a material that permeates a generated gas.

* * * * *